United States Patent Office 2,942,021
Patented June 21, 1960

2,942,021
TRI-n-PROPANOLAMINE BORATE

Stephen J. Groszos, Cincinnati, Ohio, and Nancy E. Day, Greenwich, Conn., assignors to American Cyanamid Company, New York, N.Y., a corporation of Maine No Drawing. Original application Oct. 28, 1957, Ser. No. 692,579. Divided and this application Apr. 29, 1959, Ser. No. 809,592

1 Claim. (Cl. 260—462)

This invention relates to a new chemical compound and more particularly to a new compound containing boron and nitrogen. Still more particularly the invention relates to a boron ester containing nitrogen-to-boron coordinate bonds, and specifically to tri-n-propanolamine borate, which also may be named as the boric ester of tri-n-propanolamine, and the formula for which is (I) 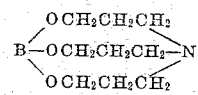

The scope of the invention also includes an unobvious use of the compound of the instant invention, namely, as a plasticizer for a polymer of acrylonitrile and, more particularly, a polymerization product containing in the polymer molecules an average of at least 75% by weight of acrylonitrile.

The present invention resulted from our preparation of tri-n-propanolamine borate and our discovery of the unexpected and unobvious properties of this compound. Specifically, we have found (among other things) that tri-n-propanolamine borate possesses unexpectedly high resistance to hydrolysis (that is, so-called "hydrolytic stability"), as a result of which it is suitable for use in the fields of utility for which other boron esters are entirely unsuited. To the best of our knowledge and belief, tri-n-propanolamine borate is the most stable hydrolytically of all the boron esters that were known prior to the present invention. It is so markedly superior in its resistance to hydrolysis as compared with the heretofore known most stable boron ester, triisopropanolamine borate, as to constitute a difference in kind rather that a mere difference in degree.

The instant invention is based on our further discovery that polymers and copolymers of acrylonitrile, more particularly homopolymeric acrylonitrile and thermoplastic copolymers of acrylonitrile, specifically such copolymers containing in their molecules an average of at least 75% by weight of combined acrylonitrile, e.g., copolymers of, by weight, from 75% to 99.5% of acrylonitrile and another monomer such, for instance, as vinyl acetate, methyl acrylate, ethyl acrylate, acrylamide, etc., are compatible with tri-n-propanolamine borate and that the latter is capable of plasticizing the acrylonitrile polymerization product to yield plasticized compositions which are suitable for use in making a wide variety of shaped or fabricated articles, including mono- and multifilaments, threads, yarns, films, bars, etc., therefrom. These plasticized compositions can be easily shaped, as by extrusion or molding, into a wide variety of useful articles of manufacture for industrial and other applications. The tri-n-propanolamine borate may be used either as a fugitive or temporary plasticizer, that is, a plasticizer which subsequently is removed from the acrylonitrile polymerization product, or as a permanent plasticizer which is permitted to remain in the shaped homopolymer or copolymer of acrylonitrile.

Homopolymeric acrylonitrile and acrylonitrile copolymers (thermoplastic acrylonitrile copolymers) containing in the polymer molecules an average of at least 75% by weight of acrylonitrile (combined acrylonitrile) are employed in carrying this embodiment of the present invention into effect. These acrylonitrile polymerization products are prepared by methods now well known to those skilled in the art. In some cases the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted so that the final copolymer contains in the molecules thereof an average of at least 75% by weight of combined acrylonitrile. The expression "polymerization product containing in the polymer molecules an average of at least 75% by weight of acrylonitrile," as used herein and in the appended claims, means a polymerization product (homopolymer, copolymer or graft polymer or mixtures thereof) containing in the molecules thereof an average of at least 75% by weight of the acrylonitrile unit, which is considered to be present in the individual polymer molecule as the group

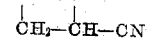

or, otherwise stated, at least 75% by weight of the reactant substance converted into and forming the polymerization product is acrylonitrile.

Illustrative examples of monomers which may be copolymerized with acrylonitrile to yield a polymerization product containing in the polymer molecules an average of at least 75% by weight of acrylonitrile are compounds containing a single $CH_2=C<$ grouping, for instance, the vinyl esters and especially the vinyl esters of saturated aliphatic monocarboxylic acids, e.g., vinyl acetate, vinyl propionate, vinyl butyrate, etc.; vinyl and vinylidene halides, e.g., the vinyl and vinylidene chlorides, bromides and fluorides; allyl-type alcohols, e.g., allyl alcohol, methallyl alcohol, ethallyl alcohol, etc.; allyl, methallyl and other unsaturated monohydric alcohol esters of monobasic acids, e.g., allyl and methallyl acetates, laurates, cyanides, etc.; acrylic and alkacrylic acids (e.g., methacrylic, ethacrylic, etc.) and esters and amides of such acids (e.g., methyl, ethyl, propyl, butyl, etc., arcylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e.g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also may be copolymerized with acrylonitrile to form copolymers which are useful in practicing the plasticizer application of the present invention, e.g., the dimethyl, -ethyl, -propyl, -butyl, etc., esters of maleic, fumaric, citraconic, etc., acids.

The proportions of monomers in the polymerizable mixture may be varied as desired or as may be required in order to obtain a polymerization product containing in the polymer molecules an average of at least 75% by weight of acrylonitrile.

Any suitable method of polymerizing the monomeric acrylonitrile or mixture of monomers may be employed, and the resulting polymerization product may be of any suitable molecular weight. Ordinarily the molecular weight (average molecular weight) of the acrylonitrile polymerization product used in practicing the claimed use embodiment of our invention is within the range of 25,000 or 30,000 to 200,000 or 300,000 or higher, and advantageously is of the order of 50,000 to 100,000, e.g., about 70,000–80,000, as calculated from a viscosity measurement of the said polymerization product in dimethyl formamide using the Staudinger equation (reference: U.S. Patent No. 2,404,713).

The proportions of the acrylonitrile polymerization product and the tri-n-propanolamine borate in the compositions of our invention may be varied widely, depending mainly upon the particular use for which the composition is intended. For some applications, e.g., where the plasticizer is intended to be permanent, and the plasticized composition will not come in contact with a solvent for the tri-n-propanolamine borate, the latter may constitute 50%, or even as much as 70% or 75%, by weight of the total amount of the acrylonitrile polymerization product and the said borate. In other applications, e.g., when the plasticized composition is to be extruded through an orifice to form filaments (mono- or multifilaments) or films, then the acrylonitrile polymerization product is generally plasticized with a plasticizing amount not substantially exceeding about 25% (e.g., from 1% to about 10% or 15%), by weight of the composition, of a plasticizer comprising tri-n-propanolamine borate.

In the average or most commonly employed plasticized compositions of this invention it may be stated, without intending to limit the scope of the invention, that the composition will comprise (1) a polymerization product containing in the polymer molecules an average of at least 85% by weight of acrylonitrile and (2) tri-n-propanolamine borate, in an amount corresponding to from about 1% to about 50% by weight of the total of (1) and (2).

The aforementioned ranges of proportions are mentioned as indicative of proportions that may be employed in forming our new plasticized acrylonitrile polymerization products, and our invention obviously is not limited to the use of only such proportions. The important factor is that the proportions be such that the plasticity of the composition at the operating temperature is within a workable range.

The compositions described above may be used in the production of various fabricated structures such, for example, as filaments, bars, rods, tubes, films, etc., in accordance with general techniques and using apparatus now generally known to those skilled in the art, the detailed operating conditions being suitably modified where required.

In order that those skilled in the art may better understand how the present invention can be carried into effect, the following examples are given by way of illustration and not by way of limitation. All parts and percentages are by weight.

EXAMPLE 1

This example illustrates the preparation of tris(2-carbethoxyethyl)amine together with bis(2-carbethoxyethyl)amine, the former being used in the preparation of tri-n-propanolamine, which is an intermediate employed in preparing tri-n-propanolamine borate. Bis(2-carbethoxyethyl)amine may also be named as bis[2-(ethoxycarbonyl)ethyl]amine; and tris(2-carbethoxyethyl)amine, as tris[2-(ethoxycarbonyl)amine].

$NH_3 + CH_2=CHCOOC_2H_5 \rightleftharpoons$
$\qquad H_2NCH_2CH_2COOC_2H_5 + CH_2=CHCOOC_2H_5$
$N(CH_2CH_2COOC_2H_5)_3 \rightleftharpoons$
$\qquad HN(CH_2CH_2COOC_2H_5)_2 + CH_2=CHCOOC_2H_5$ Ethyl acrylate (300 g., 3 moles) is placed in a bomb with liquid ammonia (510 g., 30 moles). The closed bomb is rocked for three hours at room temperature (20°–30° C.). At the end of this time excess ammonia is slowly vented off and the bomb is opened. The liquid remaining in the bomb is transferred to a distilling flask and ammonia and unreacted ethyl acrylate are distilled off under water aspirator pressure. The bis- and tris(2-carbethoxyethyl)amine are separated by fractional distillation.

Bis(2-carbethoxyethyl)amine. Yield 127 g., B.P. 119°–126° C./2–3 mm.

Tris(2-carbethoxyethyl)amine. Yield 78 g., P.B. 150°–165° C./1–1.5 mm.

EXAMPLE 2

This example illustrates the preparation of tri-n-propanolamine.

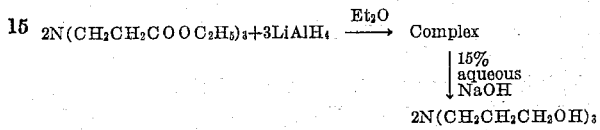

Care is taken to exclude moisture from this reaction by allowing nitrogen to flow for twenty minutes before and during the reaction through the apparatus, which consists of an over-dried, 2-liter, 3-necked, round-bottomed flask fitted with stirrer, $N_2$ inlet, dropping funnel, and condenser with "Drierite" drying tube. Powdered lithium aluminum hydride (16.5 g., 0.435 mole) is washed into the reaction flask with 500 ml. of anhydrous ether, and the slurry is stirred for 20 minutes. The dropping funnel is charged with 46 g. (0.145 mole) tris(2-carbethoxyethyl)amine in 100 ml. of anhydrous ether. The ether solution is added dropwise at an appropriate rate to produce gentle refluxing. When the addition is complete, the mixture (a grey slurry) is refluxed for 2 hours.

The excess lithium aluminum hydride and the complex of the product are hydrolyzed by the addition, in order, of 6 ml. of water, 6 ml. of 15% aqueous sodium hydroxide, and 18 ml. of water (for ng. $LiAlH_4$ use n ml. $H_2O$, n ml. 15% aqueous NaOH, and 3 n ml. $H_2O$). A voluminous, white precipitate appears. The mixture is stirred for twenty minutes. The precipitate of inorganic salts is filtered off and washed with ether. The filtrate and washings containing some of the product are set aside and saved. The residue is extracted continuously with ether in a Soxhlet extractor for 2 days. The ether extract is combined with the original ether extracts, dried over sodium sulfate and filtered. The ether is stripped off, yielding the product, a colorless oil. The tri-n-propanolamine is distilled at 175°–185° C. at 1 mm. pressure. The yield is 19.2 g. which corresponds to 69% of the theoretical.

Analysis.—calc'd. for $C_9H_{21}O_3N$: Percent C, 56.52; percent H, 11.06; percent N, 7.32. Found: Percent C, 56.77; percent H, 10.99; percent N, 7.21.

EXAMPLE 3

This example illustrates the preparation of tri-n-propanolamine borate.

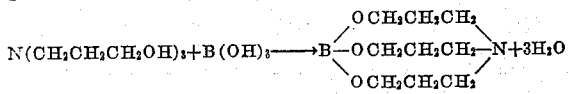

A solution of 10 g. (0.052 mole) tri-n-propanolamine, 3.22 g. (0.052 mole) boric acid, and 150 ml. dry toluene is heated to reflux in a 3-necked flask fitted with stirrer, nitrogen inlet, Dean and Stark trap and condenser. The reflux-distillation is continued until the water azeotrope ceases to come over (2.6 ml. $H_2O$ collected, 96% of theory). On cooling to room temperature colorless needles (10 g., 97% of theory) separate. Upon recrystallization twice from benzene, purified tri-n-propanolamine borate, M.P. 248° C., is obtained.

EXAMPLE 4

This example illustrates the testing of tri-n-propanolamine borate to determine its hydrolysis rate or tendency.

A solution containing 1.1944 g. of tri-n-propanolamine borate in 60 ml. distilled water (0.100 N) is allowed to stand in a tightly stoppered flask. The flask is immersed in a constant-temperature bath regulated to 25°±0.01° C. Five cc. aliquots are removed periodically for titration of liberated tri-n-propanolamine with 0.0499 N HCl in a 3 cc. capacity micro-burette fitted with a capillary tip and reservoir, using a Beckman (Model G) pH meter. [Steinberg and Hunter, Ind. and Eng. Chem., 49, 174 (1957), used a similar method to determine the rate of hydrolysis of triisopropanolamine borate.]

The approximate pK value of tri-n-propanolamine borate is found to be at pH 4.5. The amount of standard acid required to attain this pH is recorded as a convenient means of comparison. The results are shown in the following table.

Table

| Sample No. | $t_t-t_0$ (hours)[1] | Ml. 0.0499 N HCl required | Initial pH |
|---|---|---|---|
| 1 | 0.52 | 0.005±.002 | 5.58 |
| 2 | 4.23 | 0.003 | 5.65 |
| 3 | 24.2 | 0.003 | 5.81 |
| 4 | 121.1 | 0.004 | 5.98 |
| 5 | 1,032.0 | 0.005 | 5.97 |

[1] $t_t-t_0$ is the time in hours from mixing of the ester solution to attainment of pH 4.5 during titration.

Steinberg and Hunter, supra, reported on the rates of hydrolysis of a number of boric acid esters including triethanolamine borate (I), $B(OCH_2CH_2)_3N$, and triisopropanolamine borate, (II).

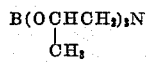

The unpredictable and outstanding hydrolytic stability of the compound of this invention, i.e., tri-n-propanolamine borate (III), over triethanolamine borate (I) and triisopropanolamine borate (II) is shown by the following comparison of the results of the aforementioned hydrolytic studies:

| Compound | Results |
|---|---|
| I | $k=5.32 \times 10^{-3}$ sec.$^{-1}$ (Steinberg and Hunter). |
| II | $k=4.67 \times 10^{-5}$ hr.$^{-1}$ } Steinberg and 8% hydrolysis occurred after 24 days } Hunter. |
| III | By the method of Steinberg and Hunter used in their hydrolytic studies of Compound II, no measurable hydrolysis occurred after 43 days (1,032 hours). |

EXAMPLE 5

Thirty percent (30%) by weight, based on the amount of homopolymeric acrylonitrile, of tri-n-propanolamine borate, is added to a 10% solution of homopolymeric acrylonitrile dissolved in dimethyl formamide, the latter being at room temperature (20°–30° C.). The mixture is stirred at room temperature or with slight warming until a homogeneous solution results. The above percentage proportion of tri-n-propanolamine borate, based on the amount of homopolymeric acrylonitrile, corresponds to about 23.1% of the total amount of polyacrylonitrile and tri-n-propanolamine borate.

A film of the solution prepared as described above is cast on glass and dried in a 105° C. forced-draft oven for 1½ hours, or longer if necessary, until substantially all of the dimethyl formamide has been evaporated. After removal from the oven and cooling to room temperature, the dried film is peeled from the glass plate. When subjected to a pull between the fingers, the film can be stretched considerably without tearing. In marked contrast a similarly prepared film made from a 10% solution of polyacrylonitrile alone in dimethyl formamide shows no stretchability under the same test conditions.

The above test indicates qualitatively the plasticizing effect of the tri-n-propanolamine borate on the polyacrylonitrile.

EXAMPLE 6

Example 5 is repeated but varying the proportion of tri-n-propanolamine borate to produce compositions containing 5%, 15%, 35% and 45% by weight of tri-n-propanolamine borate, based on the total weight of tri-n-propanolamine borate and polyacrylonitrile. Similar results are obtained, the films containing the higher percentages of tri-n-propanolamine borate showing, in general, the greater stretchability, that is to say, they are more highly plasticized.

EXAMPLE 7

Example 5 is repeated but using, instead of homopolymeric acrylonitrile, the following copolymers of acrylonitrile in individual tests:

Copolymer produced from a mixture of:
(1) 95% acrylonitrile and 5% methyl acrylate
(2) 90% acrylonitrile and 10% acrylamide
(3) 90% acrylonitrile and 10% vinyl acetate
(4) 85% acrylonitrile and 15% methyl acrylate
(5) 95% acrylonitrile and 5% acrylic acid
(6) 90% acrylonitrile and 10% hydroxyethyl methacrylate
(7) 98% acrylonitrile and 2% styrene
(8) 85% acrylonitrile, 7.5% methyl acrylate and 7.5% 2-methyl-5-vinylpyridine
(9) 75% acrylonitrile, 12.5% methyl acrylate and 12.5% vinyl acetate In each case the tri-n-propanolamine borate exerts a plasticizing effect on the acrylonitrile copolymer when using the same test described under Example 5.

EXAMPLE 8

A copolymer of 95% acrylonitrile and 5% methyl acrylate is plasticized with 20% by weight of the said copolymer of tri-n-propanolamine borate, and the resulting plasticized composition is ground to yield a molding composition. This molding composition is molded into the form of a disk at 240° C. for 15 minutes under a pressure of 4,000 pounds per square inch. A well-molded article having good flexural and tensile strengths and a good surface appearance is obtained.

Instead of using tri-n-propanolamine borate alone as a plasticizer for an acrylonitrile polymerization product, we can use the said borate in combination with other known plasticizers for homopolymeric or copolymeric acrylonitrile, and in any proportions. Examples of the latter plasticizers that can be used in conjunction with tri-n-propanolamine borate are poly-N-vinyl-2-oxalidone, 5-chloromethyl-2-oxo-oxazolidine, N-ethyl and N-phenyl ethylene carbamates, beta,beta'-iminodipropionitrile, N,N-di-(cyanomethyl)aminoacetonitrile, N,N-di-(cyanoethyl)aminoacetonitrile, and others now known to those skilled in the art.

From the foregoing description it will be seen that the present invention provides compositions comprising (1) an acrylonitrile polymerization product containing in the polymer molecules thereof an average of at least 75% by weight of acrylonitrile and (2) tri-n-propanolamine borate in an amount sufficient to plasticize the polymerization product of (1). These compositions can be shaped or fabricated, as by extrusion, molding, casting (from a solution thereof), etc., into a wide variety of useful articles. Lubricants, antistatic agents and other conventional modifiers of acrylonitrile polymerization products can be incorporated therein at any suitable stage of the operation. Although not limited thereto, the compositions of this invention are particularly useful in the production of filaments, threads, yarns, etc., which thereafter are woven into fabrics; in the production of molding compositions and molded articles; and also as capacitor dielectrics and in other applications of dielectrics. Other uses include those given in, for example, U.S.

Patents 2,520,150; 2,656,328; 2,559,172; and in patents cited in the aforesaid patents.

Other uses of tri-n-propanolamine borate are: as a latent curing catalyst for epoxy resins; in agricultural applications where hydrolytic stability and rate of hydrolysis are important; as a modifier of aminoplasts, phenoplasts and other synthetic resins and plastic materials whereby there is provided, among other things, a means of introducing boron into the composition, which is particularly desirable in neutron-absorbing shielding materials (plastics, surface coatings, etc.); as a scintillation counter material; as a component of high-temperature fluxes; in the manufacture of ceramic materials; as a fuel additive to improve anti-knock and pre-ignition properties; and for various other purposes, many of which will be suggested to those skilled in the art from the foregoing illustrative examples.

This application is a division of our copending application Serial No. 692,579, filed October 28, 1957.

We claim:

Tri-n-propanolamine borate, the formula for which is

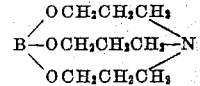

References Cited in the file of this patent

UNITED STATES PATENTS 2,785,192     Elbling et al.   ---------- Mar. 12, 1957

OTHER REFERENCES

Steinberg et al.: Ind. and Eng. Chem., vol. 49, pp. 174–81 (1957).

UNITED STATES PATENT OFFICE

CERTIFICATE OF CORRECTION

Patent No. 2,942,021　　　　　　　　　　　　　June 21, 1960

Stephen J. Groszos et al.

It is hereby certified that error appears in the printed specification of the above numbered patent requiring correction and that the said Letters Patent should read as corrected below.

Column 1, line 38, strike out "the"; column 2, line 45, for "arcylates" read -- acrylates --; column 4, line 23, for "over-dried" read -- oven-dried --.

Signed and sealed this 13th day of December 1960.

(SEAL)
Attest:

KARL H. AXLINE
Attesting Officer

ROBERT C. WATSON
Commissioner of Patents